United States Patent [19]

Böhm et al.

[11] 4,228,839
[45] Oct. 21, 1980

[54] SELF-SEALING PNEUMATIC TIRE

[75] Inventors: Georg G. A. Böhm, Akron; Mario DeTrano, Massillon, both of Ohio

[73] Assignee: The Firestone Tire & Rubber Company, Akron, Ohio

[21] Appl. No.: 930,769

[22] Filed: Aug. 3, 1978

[51] Int. Cl.³ .................... B60C 5/14; B60C 17/00
[52] U.S. Cl. .................... 152/347; 156/115; 156/272
[58] Field of Search ............ 152/152, 330 R, 330 RF, 152/346, 347, 348; 156/110 R, 115, 123 R, 272

[56] References Cited

U.S. PATENT DOCUMENTS

| | | | |
|---|---|---|---|
| 1,419,470 | 6/1922 | Reasoner et al. | 152/347 |
| 1,601,013 | 9/1926 | Wildman | 152/347 |
| 1,977,281 | 10/1934 | Knowlton | 152/346 |
| 2,657,729 | 11/1953 | Hardman et al. | 152/347 |
| 2,877,819 | 3/1959 | Gibbs | 152/347 |
| 3,048,509 | 8/1962 | Sweet et al. | 152/347 |
| 3,628,585 | 12/1971 | Pace | 152/347 |
| 4,089,360 | 5/1978 | Böhm | 152/330 R |
| 4,140,167 | 2/1979 | Böhm et al. | 152/346 |

Primary Examiner—John E. Kittle

[57] ABSTRACT

This disclosure relates to a self-sealing pneumatic tire with puncture sealing properties and a method of manufacturing such a tire. The puncture sealant properties of the self-sealing tire are provided by a layer comprised of a blend of a crosslinked polymeric material and an irradiation degraded polymeric material. The method of this disclosure comprises providing a layer of rubber compound with a blend of polymeric materials, one of which degrades upon exposure to irradiation and another which crosslinks either on exposure to irradiation, by chemical reaction at vulcanization temperature, or both, assembling the layer into an unvulcanized tire in situ with the polymeric materials unaltered, vulcanizing the tire without altering the degradable polymeric material and irradiating the tire whereby the degradable polymeric material is degraded to a low viscosity to form a tacky material and the crosslinkable polymeric material is crosslinked to form an elastic matrix for the degraded polymeric material, whereby the layer has puncture sealing properties.

8 Claims, 2 Drawing Figures

SELF-SEALING PNEUMATIC TIRE

BACKGROUND OF THE INVENTION

This invention relates to a self-sealing pneumatic tire with puncture sealant properties and a method for manufacturing the tire. The concept of a tire with puncture sealant properties is old and the prior art is replete with various methods and combinations for obtaining a puncture sealant tire and a puncture sealant composition. These prior methods, constructions and compositions all have the final goal of obtaining a tire that exhibits puncture sealing properties when a sharp object, such as a nail, punctures the tire.

Examples of such teachings go back to the early 1900's (See U.S. Pat. No. 1,601,013; 1,977,281 and 1,419,470) wherein relatively simple disclosures were made to provide a tire with a strip of raw, unvulcanized rubber which, it is stated, would have puncture sealing properties. Later teachings relate to more sophisticated tire constructions, sealant compositions and methods wherein a sealant material is encased or encapsulated in or between calendered layers (see U.S. Pat. Nos. 3,048,509 and 2,877,810).

All of these teachings have had drawbacks which have led to the commercial unacceptability of the compositions, methods and constructions. For example, the teaching of providing a tire with a layer of unvulcanized rubber has been unsuccessful due to the fact that the unvulcanized rubber would become displaced during operating of the tire and would become ineffective as a sealant material on extended operation of the tire. The more complicated structures wherein the sealant material was encased in a vulcanized material were expensive to manufacture, created other problems due to the additional weight required in the tire and did not have adequate sealing properties. The present invention overcomes the drawbacks of all of the prior art.

The demand for a self-sealing tire has been renewed by the emphasis on the elimination of a spare tire in a passenger car and energy conservation programs. A major U.S. automobile manufacturer has taken the position that a tire must have self-sealing properties in order for the elimination of a spare tire in a passenger automobile to be seriously considered.

The Applicant has previously disclosed (Ser. No. 737,884, filed Nov. 2, 1976, issued as U.S. Pat No. 4,140,167 and Serial No. 615,266, filed Sept. 22, 1975, issued as U.S. Pat. No. 4,089,360) a tire with a layer of irradiation degraded material which is tacky or gummy (a low viscosity) wherein the material is degraded prior to assembly into the unvulcanized tire. This prior method and construction was only possible when the degraded layer was laminated with another undegraded layer which permitted its handling during tire building (its tacky, sticky nature and lack of strength made it unhandable alone) and enabled it to retain its integrity during the vulcanization operation wherein high pressures are applied to the tire which would displace the layer from its desired location. As will be explained later in greater detail, this invention provides for the irradiation of the degradable material after the tire is vulcanized so that during tire building and vulcanization the material is easily handled as it is of a high viscosity. This has not been taught by the prior art.

The prior art also has taught a method wherein a sealant layer is applied to the inner periphery of a tire. This method includes the cleaning of the inner surface of the unvulcanized tire by elaborate, expensive equipment and the application of the sealant material to the inner periphery of the tire, again by elaborate, expensive equipment. The method of this invention eliminates the necessity for such elaborate equipment.

This invention provides an uncomplicated, inexpensive construction and method for obtaining a self-sealing tire. It is an object of this invention to provide a pneumatic tire with a lightweight, uncomplicated, inexpensive puncture sealing member.

It is another object of this invention to provide a sealant layer with a blend of polymeric materials that, when combined, yield sealant properties with each of the polymeric materials contributing a different characteristic to the layer. The acceptable sealant properties of the layer will not be realized one polymeric material alone, the combination of properties is required.

It is another object of this invention to provide a simplified, inexpensive method for manufacturing a tire with self-sealing or puncture sealant properties wherein certain sealant properties are provided by a material that is easily handled during building and vulcanization and that is converted by irradiation after the tire is vulcanized. The tire construction and method of this invention meet the objectives set out above.

SUMMARY OF THE INVENTION

The method of this invention provides a simplified, inexpensive process for manufacturing self-sealing pneumatic tires with puncture sealant properties. In the method of this invention an unvulcanized (green) tire is provided with a layer of rubber compound in situ that contains a blend of a first polymeric material which degrades upon exposure to irradiation and a second polymeric material that crosslinks on exposure to irradiation or that crosslinks on exposure to vulcanization temperatures or a combination of both. In this invention, this layer is assembled into the unvulcanized tire and the tire is vulcanized by standard, known methods. This vulcanization treatment does not alter the composition of the degradable (first) polymeric material or of the second polymeric material unless such second material is crosslinked at vulcanization temperatures.

The physical nature of the puncture sealant layer is such that its viscosity is high enough to permit easy handling during the standard steps in the construction of an unvulcanized tire and during the vulcanization operation; that is, the layer has enough uncured strength (modulus) to retain its shape during building, enough tack to stick to adjacent layers during building and enough strength to retain its shape during the application of the high pressures during vulcanization. It also is not too tacky to stick to undesired materials, like the building drum.

After the tire is vulcanized with the puncture sealant layer in situ, the puncture sealant layer is subjected to an irradiation treatment. The vulcanization step may partially or completely crosslink the second polymeric material or not alter its composition depending upon the nature of the second polymeric material and the ingredients in the rubber compound. If it is crosslinked, it serves as an elastic matrix for the degradable material.

The irradiation treatment degrades the degradable (first) polymeric material which results in a lowering of the viscosity of the material to yield a tacky, gummy material. It may also crosslink the second polymeric material to yield an elastic matrix for the degraded material. Regardless of the method used to crosslink the second polymeric material, it forms a matrix of crosslinked material to provide strength to the layer so that the layer will retain its shape and location. Without it, a gummy layer would be formed which would lose its shape and be easily dislodged from its proper position on the tire.

This combination of the tacky characteristic of the degraded polymeric material and the elasticity of the crosslinked polymeric material yields the puncture sealant properties of this invention. It is necessary to have both of these to yield the desired result which is the combination of tack, elasticity, resiliency, tear resistance, wetability and the like.

Degradable polymeric materials that have been found useful in this invention are polyisobutylene and copolymers containing isobutylene with conjugated olefins such as 1,3 butadiene, isoprene, 2,3 methylbutadiene; with vinyl aromatics such as styrene and alpha methyl styrene and with polar vinyl monomers such as acrylonitrile, methylvinylacrylate and methylvinylactone. It is known that these polymeric materials will degrade when subjected to an irradiation treatment.

The crosslinkable polymeric materials, either by irradiation or chemical reaction to vulcanization temperature, that are useful in this invention may be natural rubber; copolymers of styrene and butadiene, whether made by the emulsion or solution process; solution polybutadiene homopolymers; polyisoprene; block copolymers, for example styrene/butadiene/styrene block copolymers; halogenated butyl polymers, such as chlorinated butyl; ethylene propylene terpolymers; butadiene acrylonitrile copolymers and neoprene.

When referring to the composition of the sealant of this invention in this specification, all of the ingredients are based upon a rubber compound wherein the total of the polymeric material in the compound is 100 parts.

In the method of this invention, the ratio of the degradable polymeric material to the crosslinkable polymeric material must be such that the resulting layer has puncture sealant properties yet has sufficient integrity or a high enough viscosity in its unvulcanized or green state to be easily handled during standard tire manufacturing operations. These results may be obtained with different ratios of the polymeric materials. These ratios may change depending upon the specific composition of the polymeric materials utilized. It is believed that ratios between approximately 60–80 parts of the degradable polymeric material to 40–20 parts of the crosslinkable polymeric material meet the requirements set out above. A ratio of approximately 70 parts degraded polymeric material to 30 parts crosslinkable polymeric material has been found adequate.

In addition to the polymeric material, the puncture sealant composition of this invention contains other ingredients. Such ingredients are reinforcing ingredients, fillers, crosslinking agents (when necessary) and stabilization ingredients.

Specifically, the puncture sealant composition of this invention contains between 5 and 15 parts of a reinforcing material. This reinforcing material may be any of the standard reinforcing materials utilized in rubber compounds; such as carbon black, silica or calcium carbonate. It is preferred to use carbon blacks of the reinforcing type, for example, a high abrasion furnace carbon black (HAF).

Any of the known fillers for rubber compounds may be used, such as non-reinforcing carbon black, specifically the type known as MT, clays and oils.

Crosslinking ingredients are included in the puncture sealant composition when the crosslinkable polymeric material is of a type that crosslinks on exposure to vulcanization temperatures. Examples of such vulcanization agents are the standard accelerators utilized in the rubber industry; such as Santocure NS (N-Tert-butyl-2-benzothiazolesulfenamide), mercaptobenzothiazole, tetramethylthiunam disulfide; peroxides, such as dicumyl peroxide; and sulfur. The incorporation of stearic acid and zinc oxide to assist in the crosslinkage reaction, as is known, is also contemplated. When present, the accelerator should be from 0.02 to 2.5 parts, the sulfur from 0.1 to 5 parts, the zinc oxide from 0.2 to 10 parts, the stearic acid from 0.1 to 5 parts and the peroxide from 1.0 to 10 parts.

Any of the known stabilizing agents that are used in rubber compounds may be utilized in the composition of this invention. A phenylene diamine derivative marketed by the Monsanto Chemical Company under the trademark "Santoflex 13" (an N-alkyl-N'-aryl-p-phenylenediamine) has been found to be particularly effective as has another phenylene diamine derivative marketed by the Union Oil Company under the trademark "UOP-88" (N,N'-bis (1-ethyl-e-methyl pentyl) p-phenylene diamine). The amount of the stabilizing agent in the puncture sealant composition may vary from 0.1 parts to 10 parts.

The tire building equipment that is employed in this invention is standard and are not a part of this invention.

In the method of this invention a layer of rubber compound is provided with a first polymeric material which will degrade upon exposure to irradiation and a second polymeric material that will crosslink either when exposed to irradiation or by chemical reaction at vulcanization temperatures or both. This rubber compound is the puncture sealant composition and has sufficient viscosity and sufficient unvulcanized adhesion to enable its incorporation into the unvulcanized tire without departures from standard, long-standing tire building methods and without the use of complicated, expensive tire building equipment.

In the method of this invention, this puncture sealant composition of this invention is in the form of a strip of unvulcanized rubber compound that is applied to the tire building drum prior to any of the normal tire components. After the application of the puncture sealant strip of this invention to the building drum, the tire is built in the normal way using normal steps and equipment.

After the unvulcanized tire is so constructed, the tire is vulcanized by standard, known methods and with standard equipment. This vulcanization step does not affect the irradiation degradable polymeric material in the puncture sealant layer and may or may not affect the crosslinkable polymeric material in the puncture sealant layer. If the crosslinkable polymeric material can be crosslinked by a chemical reaction at vulcanization temperatures, this occurs during the normal tire vulcanization step and this material forms an elastic matrix for the degradable material.

After the vulcanization step, the tire of this invention is subjected to an irradiation treatment whereby the degradable polymeric material which previously had a viscosity sufficiently high to permit the use of the aforesaid standard tire building techniques and equipment, is degraded to a much lower viscosity so that the puncture sealant material now has a tacky or gummy or semi-fluid phase with low viscosity. It is understood that such a material if it were incorporated into an unvulcanized tire would be difficult and expensive to handle, and that the material would flow or be displaced by the pressure applied to the unvulcanized tire during the vulcanization process. Therefore, it would not be possible to build the tire of this invention by a method wherein the irradiation step was prior to the building step or prior to the vulcanization step.

The irradiation step may also crosslink the second polymeric material in the puncture sealant layer to yield a high viscosity product. This crosslinked polymeric material acts as a matrix to retain the degraded, gummy material. Without this matrix, whether obtained during the vulcanization step or the irradiation step, the degraded polymeric material would not be stable and would flow into unwanted areas of the tire on operation. Therefore, in the process of this invention, the sealant layer has sufficient properties to be processible during normal tire building operation and vulcanization. Then, at the same time as the degradable polymeric material is degraded and would become unhandable, the crosslinkable material is crosslinked to yield a matrix for the degraded material and a handable, stable product results.

The irradiation step utilized in the method of this invention may be accomplished by any of the known, standard irradiation treatments with any of the known, standard, irradiation equipment. The dosage of irradiation which is utilized in this invention and the conditions under which the dosage is applied are dependent upon several variables; that is, the type of polymeric materials in the sealant layer and the thickness of the sealant layer. This dosage may be controlled by any of the known methods and techniques for controlling irradiation exposure, such as the amount of energy employed by the electron beam. Dosages in the range of 5 to 15 megarads have been effective in the process of this invention.

Different types of irradiation may be employed which are constituted of either high energy waves, that is, x-rays and gamma rays, or particle radiation, that is, high speed electrons, protons, etc. It has been empirically determined that the use of high speed electrons from an accelerator produces certain commercial advantages. For example, accelerators can produce high energy electrons with extremely high power output, the electron beam can be directed toward the product by use of electro-magnetic focusing devices thus making effective use of the irradiation source, and finally, the electron radiation can be continually varied in intensity or completely turned off making it safe to enter the facility. Gamma rays produced by a Cobalt 60 source have neither of these advantages.

Commercially-available accelerators can readily be built into various types of processing equipment. In irradiating components of the type herein considered, one possible design of processing equipment which would meet the high speed requirements of factory operations involves directing high speed electrons on components being carried on a continuous conveyor. This process may also be controlled to graduate the extent of crosslinkage or degradation throughout the thickness of the component.

The self-sealing properties of the tire of this invention are described in detail below and will be referred to in the detailed description of the invention in reference to FIG. 1. As a piercing object, a nail, is passed through the sealant layer, the layer forms a tent ("tenting" as it is called in the art) around the object. This results in a seal between the layer and the object while the object is still in place. This tenting characteristic in this invention is provided by the resiliency factor in the crosslinked polymeric material in the layer and the tacky nature of the lower molecular weight, degraded polymeric material. As the object is withdrawn or works its way out, the puncture sealant material is pulled through the hole by the object thereby plugging the hole and retaining the seal. The pull through or recovery capacity in this invention is provided by the elasticity of the crosslinked polymeric material in the layer and the tacky nature of the low molecular weight, degraded polymeric material which causes the material to stick to the object during withdrawal. It is important that the puncture sealant material has sufficient integrity to withstand the pull through and that the material not excessively adhere to the object and break off during pull through. This integrity is provided by the crosslinked polymeric material.

DETAILED DESCRIPTION OF THE INVENTION

Figure 1:
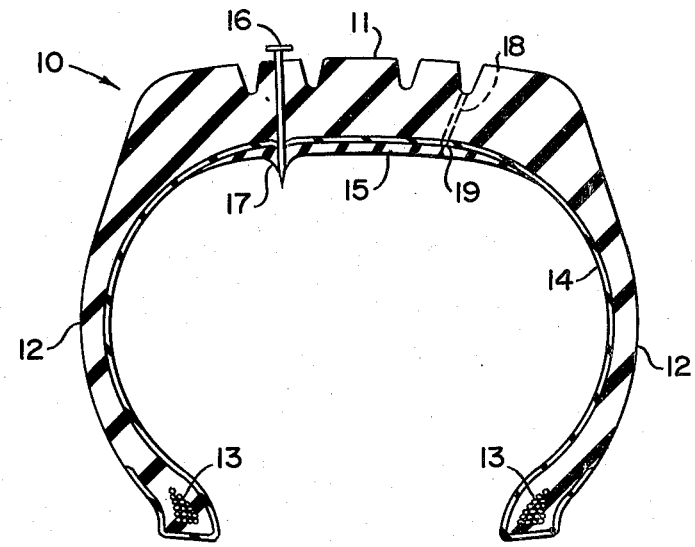
FIG. 1 is a cross-sectional view of the self-sealing pneumatic tire of this invention manufactured by the method of this invention.
Figure 2:
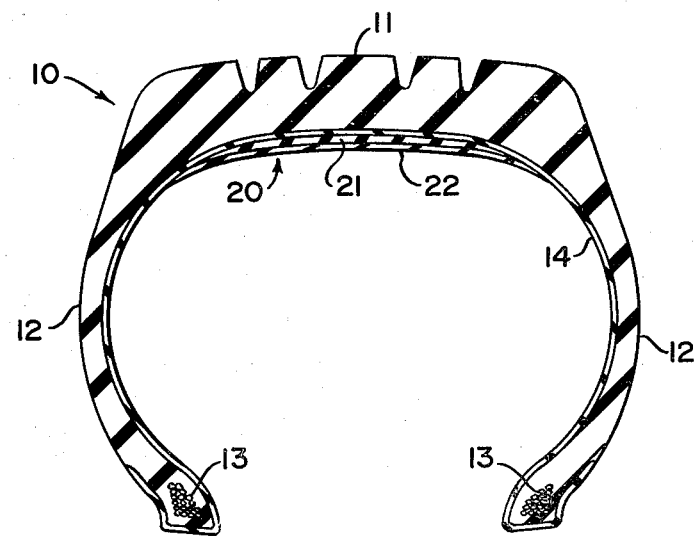
FIG. 2 is a cross-sectional view of a modification of the self-sealing pneumatic tire of this invention manufactured by the method of this invention.

In FIGS. 1 and 2 the tire is shown generally as 10 having tread, 11, sidewalls, 12, beads and 13 and innerliner 14. The structural features of the tire may be any of the known constructions; that is, radial, bias or belted bias, which are used in the standard manufacture of passenger, truck, airplane, off-the-road, agricultural or industrial tires. These features do not comprise part of this invention.

In FIG. 1 the sealant layer is shown as 15. It is located on the inner periphery of the tire in the crown area radially inward of the road-engaging tread surface, 11, and radially inward of innerliner, 14. The tire as shown in claim 1 is manufactured by the method set out in detail in the "Summary of the Invention" portion of this specification.

FIG. 1 also depicts the operation of the self-sealing feature of this invention. On the left side of the figure a nail, 16, is shown in a puncturing position in the tire. The nail, 16, is shown as passing completely through tread, 11, innerliner 14, and sealant, 15. The tenting feature of this invention is shown by the configuration of the sealant layer around the nail, 16, on the inner periphery of the sealant at 17. This feature is accurately depicted in the drawing by the sealant adhering to and forming a seal around nail, 16, as shown at 17.

The operation of the self-sealing feature after the piercing object has been withdrawn is shown at 18 and 19 in FIG. 1. After the object as been withdrawn a passageway exists in the tread 11 and the innerliner 14. This is shown by the dashed lines 18. During withdrawal the sealant of this invention will adhere to the object and thereby be pulled through the hole caused by the piercing object closing this hole and moving radially outward into the innerliner to cause a total seal. This is shown in the drawing at 19.

FIG. 2 is a modification of this invention. In this modification the puncture sealant layer, 20, is comprised of a laminate of the puncture sealant composition, 21, and a cover layer, 22. Again, the sealant, 20, is located on the inner periphery of the tire in the crown area. Again, this layer is applied by the method described in detail in the "Summary of the Invention" section in this specification with the following modification. In this embodiment a laminate of the sealant material and a cover layer is first formed. This laminate is applied to the unvulcanized tire in the manner previously set out with the cover layer located radially inward of the sealant layer. The tire is then constructed by the method described in the "Summary of the Invention" portion of this specification.

The cover layer in this embodiment may comprise any of the known materials and compositions that are used as innerliner in the tire or may comprise other compositions and materials that have been used as such cover layers. It is preferred that this material be comparable to the innerliner composition in the tire. This cover layer may contain vulcanization ingredients and be crosslinked during the normal vulcanization process as is well known in the art or it may contain material that will crosslink on exposure to irradiation and will be crosslinked during the irradiation step, after vulcanization. It is preferred that the material be of the vulcanization crosslinked type.

The advantage of the embodiment in FIG. 2 is that the cover layer will hold the sealant in place during prolonged operation of the tire of this invention and will prevent the sealant from deterioration during such prolonged operation.

It is also possible to construct the innerliner of the tire from a laminate containing a layer of the puncture sealant material. In this embodiment (not pictured) the tire would be as it appears in FIG. 1 except the sealant, 15, would be part of the innerliner, 14. This laminate can be formed by known methods such as calendering and coextrusion. In the method of this invention, the laminate would be formed and applied to the building drum as a normal innerliner. Then the method as described in the "Summary of the Invention" part of this specification would be followed with the irradiation step after the vulcanization step.

Table I describes representative puncture sealant formulations of this invention which have been found satisfactory and Table II sets out certain physical properties of these formulations.

These formulations are of the type wherein the crosslinkable polymeric material is crosslinked during the irradiation step. Vulcanization accelerators and sulfur or a peroxide, as disclosed previously, may be added if it is desired to employ a polymeric material that will at least partially crosslink at vulcanization temperatures. All of the formulas are defined with the total polymer equal to 100 parts, the common method of describing a rubber compound in the industry. In Table I the polymeric material that crosslinks on exposure to irradiation or vulcanization or both is defined generally as "Polymer 1" with specific examples listed thereunder and the polymer material that degrades upon exposure to irradiation is defined generally as "Polymer 2" with specific examples listed thereunder.

Formula 1 defines the range of the materials that are useful in the puncture sealant of this invention. Formulas 2, 3, 4, 5 and 6 describe puncture sealants that have been formulated and tested and found to have at least adequate properties.

The puncture sealant formulations set out in Table I were mixed in the Brabender for 10 minutes at 125° C. and 40 rpm. The resulting compounds were subsequently molded into 0.125 inch (0.318 cm) plaques at 135° C. for 10 minutes. The plaques were then irradiated via a double-side irradiation technique to nominal total surface doses of 7.5, 10, and 12.5 Megarads, as indicated in the Table. For Instron testing, ¼"×2½× strips were die cut from the plaque and tested in triplicate at room temperature at 10 in/min crosshead speed.

The data set out in Table II shows the physical properties of the plaques of puncture sealants prepared and tested as set out above in an unirradiated state and after irradiation at three levels. The data demonstrates the integrity that is obtained in the puncture sealants after irradiation.

TABLE I

| Formulation | 1 | 2 | 3 | 4 | 5 | 6 |
|---|---|---|---|---|---|---|
| Polymer one | 20–35 | | | | | |
| Chlorobutyl | | 22.2 | | 22.2 | 30 | 30 |
| Ethylene propylene terpolymer | | | 22.2 | | | |
| Polybutadiene | | | | | | |
| Styrene-butadiene-styrene block | | 5.6 | 5.6 | 5.6 | 5 | 5 |
| Polymer two | 80–65 | | | | | |
| High MW Polyisobutylene | | 43.3 | 43.3 | 43.3 | 36.4 | 36.4 |
| Low MW Polyisobutylene | | 28.9 | 28.9 | 28.9 | 28.6 | 28.6 |
| Reinforcing Pigment | 5–15 | | | | | |
| HAF | | 10.6 | 10.6 | 10.6 | | 4.7 |
| MT | | | | | 9.5 | |
| Stabilizing Agents | 0.1–10 | | | | | |
| Santoflex 13 | | 0.81 | 0.27 | 0.27 | 2.9 | 2.9 |
| UOP-88 | | 0.81 | 0.11 | 0.11 | 2.9 | 2.9 |

TABLE II

| Sealant Formulation | Dose, Megarads | 300% Modulus MPa | 300% Modulus psi | Tensile Strength MPa | Tensile Strength psi | Elongation at Break (%) | Sealant Properties |
|---|---|---|---|---|---|---|---|
| 2 | (unirradiated) | 0.126 | 18.3 | 0.066 | 9.6 | 900* | |
| | 7.5 | 0.067 | 9.7 | 0.132 | 19.1 | 700 | Good |
| | 10 | 0.079 | 11.5 | 0.121 | 17.5 | 625 | |
| | 12.5 | 0.081 | 11.8 | 0.110 | 16 | 525 | |
| 3 | (unirradiated) | 0.126 | 18.3 | 0.072 | 10.4 | 900* | |
| | 7.5 | 0.066 | 9.5 | 0.070 | 10.1 | 375 | Fair |
| | 10 | 0.086 | 12.5 | 0.101 | 14.7 | 475 | |
| | 12.5 | 0.083 | 12.0 | 0.090 | 13.1 | 375 | |
| 4 | (unirradiated) | 0.116 | 16.8 | 0.092 | 13.4 | 725* | |
| | 7.5 | 0.141 | 20.4 | 0.201 | 29.2 | 500 | Good |
| | 10 | 0.139 | 20.1 | 0.158 | 22.9 | 400 | |
| | 12.5 | 0.128 | 18.5 | 0.141 | 20.4 | 400 | |
| 5 | 10 | 0.021 | 3 | 0.096 | 14 | 1025* | Excellent |
| 6 | 10 | 0.028 | 4 | 0.089 | 13 | 1025* | Excellent |

*Instron crosshead at maximum travel. Samples did not reach breaking elongation.

The irradiation degradable material that has been found useful in this invention consists of a mixture of a high molecular weight polyisobutylene and a low molecular weight polyisobutylene. Table III identifies these materials and sets out the molecular weights of the materials both before and after the irradiation step. The low molecular weight material is assumed to remain unchanged by the irradiation treatment. This blend of high and low molecular weight polyisobutylene has been found to be necessary to maintain the proper combination for the process of this invention. Table III also sets out the change in molecular weight that occurs in an irradiation crosslinkable material for comparison purposes.

TABLE III

| Number Average | Polyisobutylene | | Chlorobutyl |
|---|---|---|---|
| | High M.W. | Low M.W. | |
| | (Vistanex L-80) | (Indopol H-300) | |
| Molecular weight | | | |
| Unirradiated | 446,000 | 1,290 | 428,000 |
| Irradiated | 19,300 | 1,290 | Gel |
| Weight Average | | | |
| Molecular weight | | | |
| Unirradiated | 1,482,000 | — | 723,000 |
| Irradiated | 55,800 | — | Gel |

We claim:

1. In the method of manufacturing a pneumatic tire containing a puncture sealant layer in situ located in the crown area of the tire radially inward of the body reinforcing plies, the steps comprising providing a layer comprised of blended rubber compound with a first polymeric material that degrades on exposure to irradiation and a second polymeric material that crosslinks when exposed to a treatment selected from irradiation, vulcanization temperatures or a combination of both, assembling said layer into an unvulcanized tire as its innermost layer in the crown area, vulcanizing said tire, and subsequently irradiating said tire to degrade said first polymeric material whereby said first polymeric material yields a tacky material within said crosslinked second polymeric material which acts as a matrix for said first polymeric material, whereby said rubber layer with said polymeric combination has puncture sealing properties.

2. The method of claim 1 wherein said second polymeric material is at least partially crosslinked during the vulcanization step.

3. The method of claim 1 wherein said second polymeric material is at least partially crosslinked during said irradiation step.

4. The method of claim 1 wherein said first polymeric material is selected from a group consisting of polyisobutylene and copolymers of polyisobutylene.

5. The method of claim 1 wherein said second polymeric material is selected from a group consisting of a halogenated butyl rubber, an ethylene propylene terpolymer, polybutadiene, copolymers of styrene and butadiene, block copolymers, butadiene acrylonitrile copolymers, natural rubber, polyisoprene and neoprene.

6. A self-sealing pneumatic tire comprising an annular road-engaging tread surface, two sidewalls each connecting a side of said tread surface to an annular bead, reinforcing body plies extending from one bead to the other through the sidewalls and tread and a puncture-sealant layer located in the crown area of said tire radially inward of said reinforcing body plies, said puncture-sealant layer comprising a blend of a first polymeric material that degrades on exposure to irradiation and a second polymeric material that crosslinks on exposure to irradiation, vulcanization temperatures or both to form an elastic matrix for said first polymeric material, said tire manufactured by the steps comprising providing a layer comprised of blended rubber compound with said blend of said first and second polymeric materials, assembling said layer into an unvulcanized tire as its innermost layer in the crown area, vulcanizing said tire, and subsequenty irradiating said tire to degrade said first polymeric material whereby said first polymeric material forms a tacky material in said second crosslinked polymeric material which acts as an elastic matrix for said first polymeric material, whereby said layer with said polymeric material combination has puncture sealing properties.

7. The tire of claim 6 wherein said first polymeric material is selected from a group consisting of polyisobutylene and copolymers of polyisobutylene.

8. The tire of claim 6 wherein said second polymeric material is selected from a group consisting of a halogenated butyl rubber, an ethylene propylene terpolymer, polybutadiene, copolymers of styrene and butadiene, block copolymers, butadiene acrylonitrile copolymers, natural rubber, polyisoprene and neoprene.

* * * * *